United States Patent [19]

Sarson et al.

[11] Patent Number: 4,581,733
[45] Date of Patent: Apr. 8, 1986

[54] TELECOMMUNICATION EXCHANGE

[75] Inventors: Gary A. Sarson, Ottawa, Canada; David M. Davidson, Codicote; John R. Bungard, London, both of England

[73] Assignee: Standard Telephones and Cables plc, London, England

[21] Appl. No.: 538,273

[22] Filed: Oct. 3, 1983

[30] Foreign Application Priority Data

Oct. 2, 1982 [GB] United Kingdom ................. 8228206

[51] Int. Cl.[4] ....................... H04A 11/04; H04M 3/00
[52] U.S. Cl. ......................................... 370/67; 370/85
[58] Field of Search ............................. 370/85, 67, 89; 179/18 ES

[56] References Cited

U.S. PATENT DOCUMENTS

| 3,941,936 | 3/1976 | Graham et al. | 370/67 |
| 4,061,880 | 12/1977 | Collins et al. | 370/67 |
| 4,140,877 | 2/1979 | Joslon et al. | 370/67 |
| 4,187,399 | 2/1980 | Maxfield et al. | 370/67 |
| 4,242,749 | 12/1980 | Takezoe | 370/85 |
| 4,287,590 | 9/1981 | Bouke et al. | 370/67 |
| 4,370,743 | 1/1983 | Moran | 370/67 |
| 4,383,137 | 5/1983 | Aikawa et al. | 379/18 ES |
| 4,385,379 | 5/1983 | Kelly et al. | 370/67 |
| 4,455,646 | 6/1984 | Bloodworth | 370/67 |
| 4,488,004 | 12/1984 | Bogart et al. | 179/18 ES |

OTHER PUBLICATIONS

Advances for Today, Bell Labs, vol. 60, No. 9, Nov. 1982.
Data Communications in MD 110, Bainicoat, Boman, and Vlancer.
Berndt et al., "Siemens Switching Processor 103D," 6/82, All.

Primary Examiner—Douglas W. Olms
Assistant Examiner—Curtis Kuntz
Attorney, Agent, or Firm—Kerkam, Stowell, Kondracki & Clarke

[57] ABSTRACT

In a small business-type telephone exchange, calls are set up in TDM manner using PCM to convey speech and data if the exchange serves any data terminals. The exchange has subscriber line ports (SLC) each serving two lines and a smaller number of trunk line ports (TLC) each serving a trunk to a local exchange. Each port has a local processor (SIP) with analogue-digital and digital to analogue conversion circuitry (CODEC-FILTER-TSAC). The exchange also has a central processor (CCP) with its associated memories (ROM, RAM, EAROM).

The ports and the central processor are interconnected by an intelligence bus (PCM BUS) and a signalling bus (SIG BUS). The central processor (CCP) and the port processors (SIP) co-operate in call setting with all communications between the processors over the signalling bus. During operation the central processor (CCP) polls the ports via the signalling bus (SIG BUS) for ports needing the services of the central processor and also to pass call control information to those ports.

To set up a call between the lines, or a line and a trunk, two time slots in the TDM cycle are allocated to the call by the central processor, one for each direction of transmission. The intelligence bus (PCM bus) is thus used only to convey intelligence, i.e. speech and/or data and tones.

11 Claims, 3 Drawing Figures

TELECOMMUNICATION EXCHANGE

BACKGROUND OF THE INVENTION

This invention relates to automatic telecommunication exchanges, and especially to such exchanges for use as PABX's.

The system to be described herein is an expandable digital PABX intended for the small business user. It caters for voice calls, any combinations of voice and data calls, data calls only, and ISDN (Integrated Services Digital Network) access.

SUMMARY OF THE INVENTION

According to the invention there is provided an automatic telecommunication exchange, in which telecommunication connections are set up in time division multiplex (TDM) manner, in which the exchange includes a number of system ports each connected to an intelligence bus and a signalling bus, each said port serving one or a small number of subscriber lines and including a processor connected to the signalling bus, in which the exchange includes a central processor which is also connected to the signalling bus, in which the central processor and the port processors co-operate in call establishment, all communication between the processors being via the signalling bus, in which the central processor polls the port processors successively in search of port processors whose conditions indicate that they need service, and in which the time slots in the TDM cycle to be used to set up calls over the intelligence bus are allocated by the central processor, the lines involved in the calls being connected to the intelligence bus at the appropriate time slots by the respective port processors, the arrangement being such that all signalling is effected via the signalling bus, the intelligence bus being used only for the conveyance of intelligence such as speech and tones.

BRIEF DESCRIPTION OF THE DRAWINGS

An embodiment of the invention will now be described with reference to the accompanying drawings, in which.

DESCRIPTION OF THE PREFERRED EMBODIMENT

The exchange described herein is an expandable digital PBX, intended for the small business user. It uses time division multiplex (TDM), with PCM, and the basic time slot rate in 8 KHz, with a 32 slot frame. Two of these slots are used for the conveyance of tones, which leaves 30 available for voice/data communication. Separate slots are used for the two directions of transmission. The basic system is equipped with 10 "physical slots" giving, for example, up to 10 extension lines and 5 trunk lines. This is a non-blocking arrangement: if some blocking can be tolerated a larger number of extension lines and/or trunk lines can be provided. An expansion unit can be added to give a further 10 such "slots", to provide up to 20 extension lines and 10 trunk lines. Note that extension lines are equipped in steps of two and trunk boxes in steps of one, and that the actual configuration is flexible.

Figure 1:
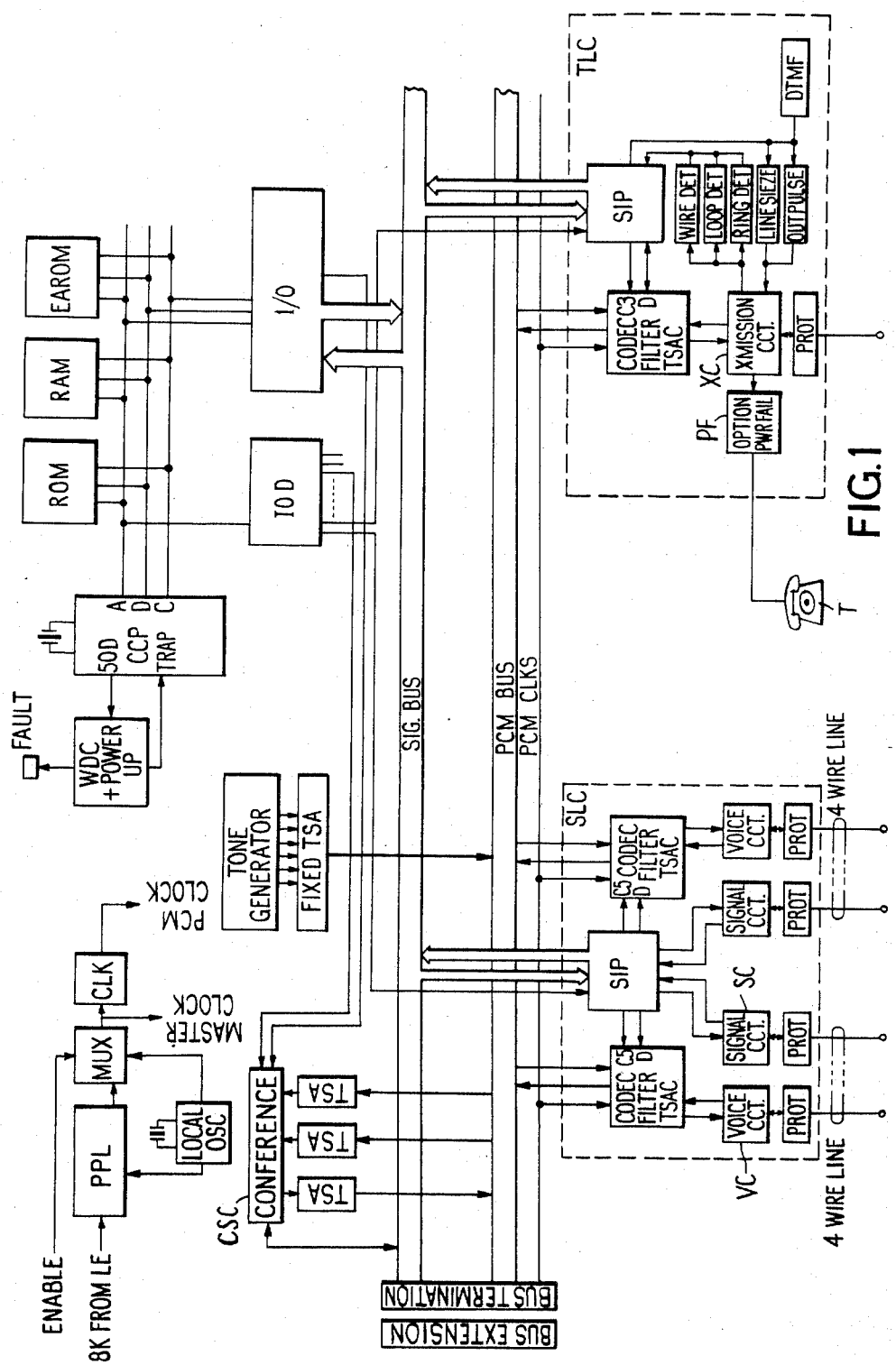
FIG. 1 is a system block diagram of a telecommunication exchange embodying the invention.

Referring now to FIG. 1, the exchange has a central control processor CCP with which are associated various blocks of memory. This includes the memory block ROM containing operational software, a block EAROM for permanent data of the system, and a block RAM which is random access memory to provide a working memory. The processor CCP has access to a common system signalling bus SIG BUS via an input/output block I/O, and an input/output decode block IOD. Associated with the processor is a watch dog controller WDC, the operation of which will be described later.

The extension lines' and trunk lines' have access to the exchange's ports via subscriber line cards SLC, trunk line cards TLC, digital line cards and data line cards. Each of the above cards can occupy one "physical slot" on the backplane of the exchange, to which the card is attached by a self-supporting connector, and may support one or two system terminals, as will be seen. Each card has a microprocessor, enabling a uniform interface to the bus, whichever terminal is to be connected. Digital trunk access is provided by an ISDN line card, as will be explained below.

A subscriber line card such as SLC connects two telephone terminals to the exchange, and carries two line circuits controlled by a single on-chip microprocessor SIP. A line circuit includes a combined codec/filter, which converts audio analogue signals to and from A-bus 8-bit PCM and an interface circuit (SLIC) which performs two-four wire signal conversion and feeds the audio portion of the telephone, i.e. the block VC. This latter is connected to the telephone via protection circuitry PROT. Note the telephone terminal is four wire, two for audio and two for signals. A data circuit SC enables signalling to and from the terminal, i.e. dialled digits, on/off hook, tone caller on/off, etc. As can be seen from FIG. 1, all signalling information is processed by the processor SIP, at the line card SLC which is regularly polled by the CCP over a common signalling bus SIG BUS, which interconnects all of the processors. There is also a common PCM bus which interconnects all line cards, and a common clock bus PCM-CLK.

A line card's SIP also controls the codec, with which is associated a time slot assignment circuit TSAC, the function of which will be described later; to assign transmit and receive timeslots under the control of CCP. The elimination of signalling from the speech path enables the cost of the speech line circuit to be reduced, as no ringing supplies are needed, and no loop detection is needed. The power feed to the telephone terminal is via the signalling pair, and supplies a higher level of current at −50 V than is needed for a normal telephone. The actual signalling on this pair uses a technique, in which the line voltage is modulated, without affecting the power feed circuitry. The data rate is 6000 baud.

A digital line card, which is similar in many respects to a subscriber line card SLC, permits two digital subsets to be connected to the system. It includes duplicate circuits made up of a line transmission section, multiplexer/demultiplexer section and time slot assigner. As in the subscriber's line card SLC, a data line card is controlled by a single chip microcomputer.

A trunk line card TLC is similar to the other cards except that it carries a single trunk circuit only. It has a transmission and signalling circuit XC, suited to the local exchange (or larger PABX) to which the exchange shown is connected. The TLC also has various detection circuits, i.e. WIRE DET, LOOP DET, and RING DET, and a LINE SEIZE circuit and OUTPULSE circuitry. Associated with all of these there is a two VF generator DTMF. An option available and shown in FIG. 1 is a power fail circuit, with which is associated a standard telephone T, so that communication is possible over the trunk during power failure conditions. It is also possible to provide tie line operation to another PABX.

A data line card can also be provided: this operates as a data port with no voice working. It is the same as the digital card and mentioned above, except for some additional logic to enable standard data terminals to be connected to it. This enables data at band rates such as 2400, 9600, 19200, etc to be multiplexed up to the 64K bit rate used in the exchange shown.

The conference supervision circuit CSC allows three-party calls, either two extensions plus one trunk, or one extension plus two trunks, or three extensions. Two of these may be provided, although only one is shown. This circuit CSC takes the PCM codes from the three conferees and selects the one of largest amplitude, which is then passed to the parties with lower amplitudes. Hence a conferee always hears the loudest party's voice, but not his own. The circuit CSC also uses a microprocessor. Connection to the PCM bus is via three serial in-parallel out shift registers for the "talk" timeslots, and via a single parallel in-serial out shift register for connection to the "listen" timeslots.

The various tones used in the exchange are generated by a ROM based synthesiser circuit.

The PCM bus consists physically of the ten connectors in the exchange case to which the various line cards are plugged, and the interconnecting tracks on the printed circuit board backplane. This is extendable to twenty such connections by adding a second plug-in backplane. There are five tracks on the backplane, four of which interconnect four pins of each line card. The tracks are terminated at each physical end of the bus to reduce distortion due to reflection. The tracks and the signals they convey are as follows:

(a) PCMLISA is the "listen" connection for the A channel of an SLC, and also the "listen" connection for the speech channel of a TLC.

(b) PCMLISB is the "listen" connection for the B channel of an SLC.

(c) PCMTLKA is the "talk" connection for the A channel of an SLC and of a TLC.

(d) PCMTLKB is the "talk" connection for the B channel of an SLC.

(e) AUXPCM is a spare PCM bus, for possible use, for example, as a data channel for ISDN (Integrated Services Digital Network) aperatus.

The PCM bus has 32 slots, at 64K b/s, which forms a 2.048M bit/sec. system, and is serial in operation, with 8-bit codes. As already mentioned, two slots, 0 and 1, are reserved for tones, which leaves 15 full duplex channels available. Timing is controlled by the clock bus PCM-CLKS.

The signalling bus S16 BUS enables CCP to communicate with the SIP's, and is 8-bit wide bidirectional, the SIP's acting as slaves to CCP. An SIP assembles any serial signalling from its terminal into message packets ready to send them on the SIG BUS when requested by CCP. Any messages to be sent to a telephone from CCP are reformatted by its SIP to allow serial signalling.

The S1G BUS is eight bits wide, i.e. eight parallel data line tracks on the backplane, with tracks for another five signals, as listed below.

(a) DSO-DS7 are the eight data lines, which go to every line card and CSC. They are connected to the internal data bus of CCP via a bidirectional buffer, and are terminated to reduce distortion due to reflection.

(b) SRD is the signal bus read signal, which also goes to every line card and CSC. It is driven from CCP via a buffer, and is used by CCP to "tell" the appropriate SIP that a byte transfer to the CCP is needed.

(c) SWR is the signal bus write signal, which also goes to every line card and CSP. It is driven from CCP via a buffer, and is used to "tell" the SIP that a byte transfer from the CCP is needed.

(d) SIPSEL n is a unique signal to every line card and CSC, derived from the I/O decoder of the CCP and used by it to select the SIP or CSC for which a data transfer in either direction is needed.

(e) SELECT goes to every line card and CSC, and is driven by the CCP address line via a buffer. It is used by CCP to indicate whether the byte transfer is to be status information or data.

(f) SIPCLK is the line card SIP drive clock, sent to every line card and CSC. It is generated by the clock systems and has a frequency of 6 MHz, $+/-0.1\%$.

(g) SIPRST is the line card reset signal, and goes to every line card and CSC. It is derived from the CCP RESET OUT pin, used to reset the SIP's and CSC's when the exchange is powered up.

The clock bus PCM CLK has three parallel tracks to all line cards and track cards, the tracks and signals being listed below.

(a) PCM CLK is a 2.048 MHz clock, the actual bit rate for the PCM code on the PCM bus.

(b) FRM SYNC identifies the positive edge of the first PCM CLK bit in a frame.

(c) REMCLK is connected to every card SLC or TLC, and carries an 8 KHz clock from one only of any digital trunk or ISDN cards equipped. This clock feeds the SYNC input of the clock systems, and aligns the PCMCLK to it and "locks on".

PCMCLK and FRMSYNC are generated by the clock systems. All bus tracks are terminated to reduce distortion due to reflection.

When the exchange of FIG. 1 is connected to a local exchange via a digital trunk, these clocks must be synchronised with those of the local exchange. This is done by aligning the local oscillator with a clock extracted from the local exchange signalling.

Figure 2:
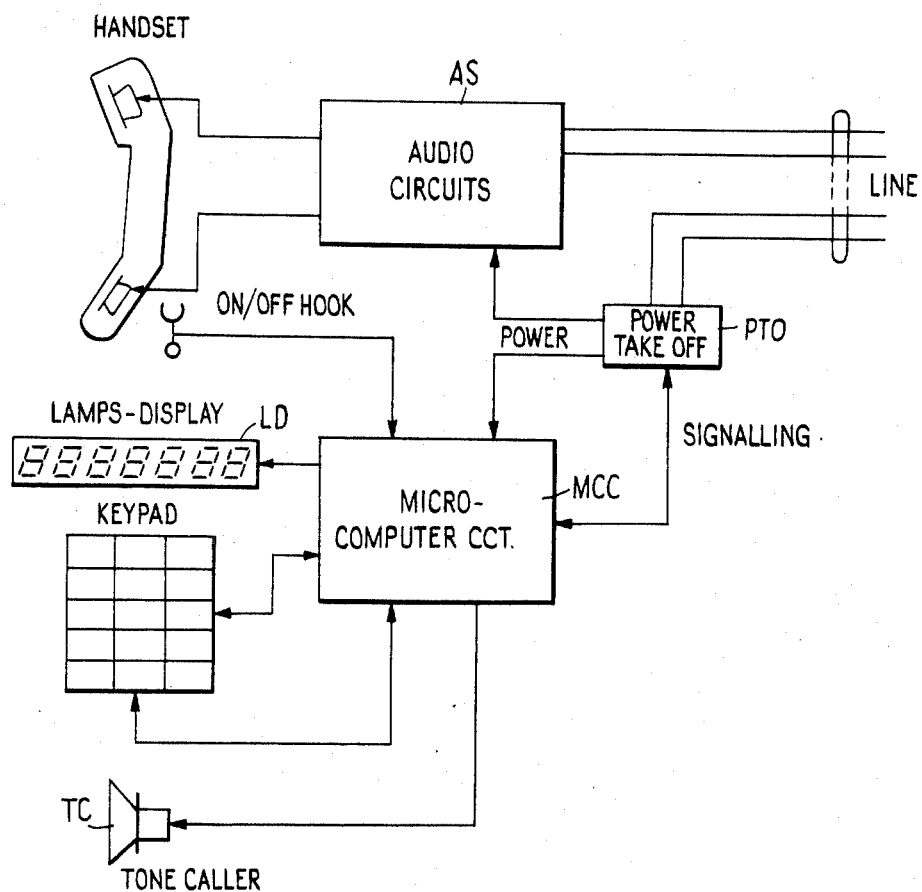
FIG. 2 is a block diagram of one of the terminals used in the system of FIG. 1.

The telephone terminal used, FIG. 2, includes a conventional analogue speech circuit AS, but all signalling such as on/off hook, digit sending and ringing uses the separate data circuitry. This is all controlled by a microcomputer MCC, which communicates with the line card's SIP via a two-wire serial line. MCC also controls keyboard decoding, lamp driving for the display LB, tone caller TC, and on/off hook detection. A power take off circuit PTO derives power from the line's signalling pair.

In addition to the keypad shown, there is a set of programmable function keys (not shown), usable for repertory dialling, signal button or "intercom-type" working for internal calls, and "bus/secretary" facilities.

An operator's console is a standard telephone terminal with such facilities as needed.

Figure 3:
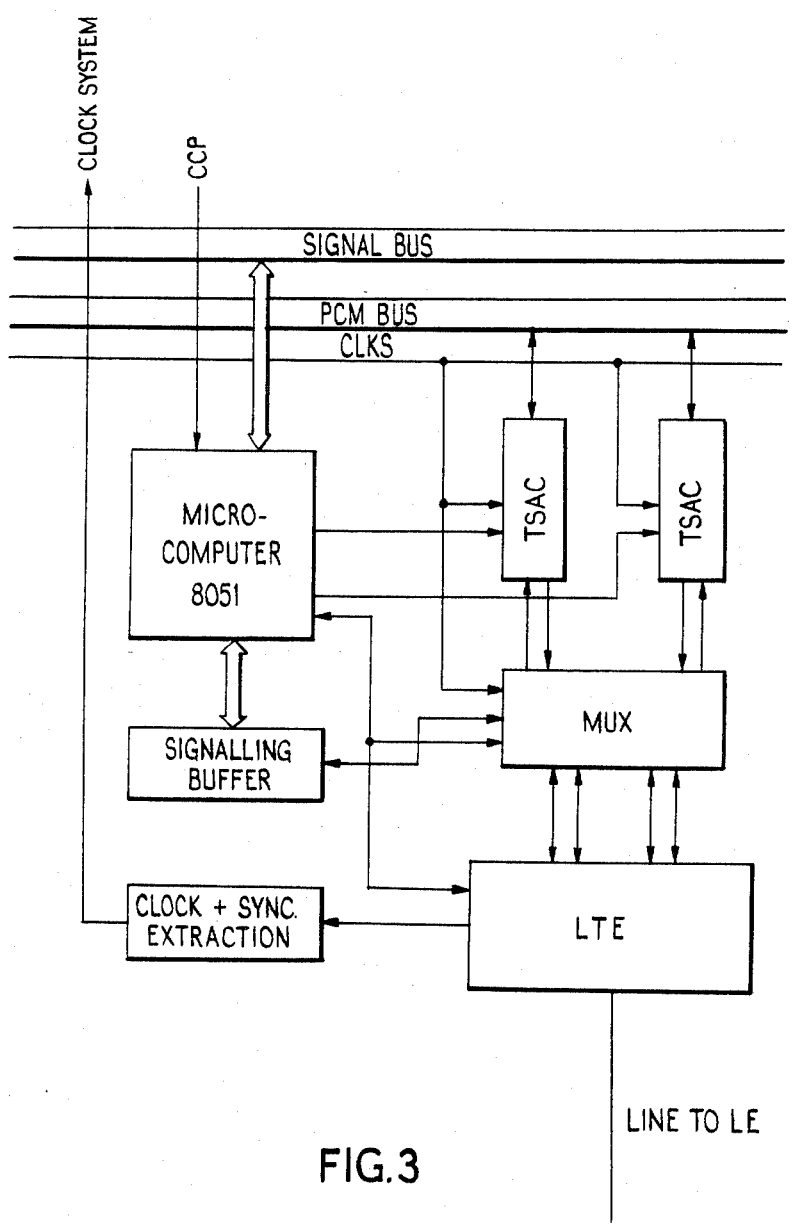
FIG. 3 is a block diagram of an ISDN line card which may be used in the system of FIG. 1.

FIG. 3 shows an ISDN line card, which in many respects resembles an SLC, except that it connects one line to a local exchange to an exchange such as that of FIG. 1. This line card include line transmission equipment LTE, a multiplexer/demultiplexer MUX and the interface to a system such as FIG. 1. This includes the time slot assignment circuitry TSAC, microcomputer, signalling buffer and the clock/sync extraction. The microcomputer encodes and decodes the signalling on the 16K bit channel of the ISDN link for CCP. The two 64K bit channels are routed separately from the exchange, hence the use of two TSAC's, either to another ISDN and for connection to a system terminal or to a separate source and data port.

The ISDN card also has a line-powered section for connection to a digital subset to provide for voice calls only during power failure conditions.

The MUX "front end" contains a clock extraction section which produces an 8 KHz clock from the 16K bit channel. This clock is routed to the exchange's clock circuitry so that it can lock to and thus be in sync with the local exchange. Frame alignment is also effected in MUX.

During operation of the system, the central processor CCP polls the processors SIP on the line cards SLC, TLC, sequentially in search of one which requires service. When a subscriber initiates a call, his off-hooking is detected by the processor SIP on his line card, via the subscriber's signal circuit SC. In response to such detection, the processor SIP applies a marking to the signal bus, and this marking is detected when the processor CCP polls the "calling" processor SIP.

When CCP finds a "calling" SIP, the identification thereof is signalled via the signalling bus to CCP, the information thus signalled including an identification of the wanted line or trunk. CCP then, during its polling cycle tests the wanted line or trunk for busy or free, and if it is free it "letts" it by a pocket of information sent over the SI6 BUS of the identity of the calling line. The wanted line or trunk (unless the outgoing connection is set up) receives the appropriate tones from the tone generator. These would include busy tone if the wanted line is busy.

If the call can be set up, CCP allocates two free time slots on the PCM bus for the call, and advises the line cards in question. Then unless the wanted line responds to the ringing by off-hooking, the call is completed.

We claim:

1. An automatic telecommunication exchange, in which telecommunication connections are set up in time division multiplex (TDM) manner using respective time slots in a TDM cycle, the exchange comprising a number of system ports, each being connected to an intelligence bus and to a signalling bus, each said port serving one or a small number of subscriber lines and including a port processor connected to the signalling bus; and a central processor connected to the signalling bus, the central processor and the port processors cooperating in call establishment by communicating with each other via the signalling bus, the central processor being effective to allocate time slots selected from the TDM cycle to set up calls between subscriber lines over the intelligence bus, and the port processors controlling the connection of the lines involve in the calls to the intelligence bus at the allocated time slots so as to afford communication directly between the lines without going through the central processor, the arrangement being such that all signalling is effected via the signalling bus, the intelligence bus being used only for the conveyance of intelligence such as speech and tones.

2. An automatic telecommunication exchange, in which telecommunication connections are set up in time division multiplex (TDM) manner using respective time slots in a TDM cycle, the exchange comprising a number of system ports, each being connected to an intelligence bus and to a signalling bus, each said port serving one or a small number of subscriber lines and including a port processor connected to the signalling bus; and a central processor which cooperates with the port processors in call establishment, all communication between the processors being via the signalling bus, the central processor including means for polling the port processors successively in search of port processors that need service to set up a call between two lines, and being effective to allocate two time slots selected from the TDM cycle on the intelligence bus to the call for each port processor that needs service, one said time slot for each direction, and the port processors including means responsive to the time slot allocation for a call for connecting the lines involved in that call to the intelligence bus at the allocated time slots so as to afford direct communication between such lines without going through the central processor, the arrangement being such that all signalling is effected via the signalling bus, the intelligence bus being used for the conveyance of intelligence such as speech and tones.

3. An exchange as claimed in claim 2, in which each of the system ports which serve subscriber lines serves two such lines, the processor for that port functioning in respect of both of the lines which it serves.

4. An exchange as claimed in claim 2, in which one or more trunk line ports are provided, each said trunk line port serving a trunk from the exchange to a remote exchange.

5. An exchange as claimed in claim 4, in which each said trunk line port includes a power failure responsive device which, in response to a power failure in the exchange, connects a telephone to the trunk line.

6. An exchange as claimed in claim 3, in which one or more trunk line ports are provided, each said trunk line port serving a trunk from the exchange to a remote exchange.

7. An automatic telecommunication exchange in which telecommunication connections are set up in time division multiplex (TDM) manner, and which exchange comprises:

a plurality of system ports, each of which serves one or a small number of subscriber lines, each said system port including a port processor;

an intelligence bus and a signalling bus, each of which is connected to all of said system ports, the signalling bus but not the intelligence bus being connected at each system port to the port processor at such system port; and a central processor connected to the signalling bus but not connected to the intelligence bus, the central processor and the port processors being constructed to cooperate in call establishment between subscribers with all communication between the port processors being effected via the signalling bus;

each port processor being formed such that, upon a subscriber initiating a call, the port processor at the initiating subscriber's port assumes a condition indicative of a calling condition at the initiating subscriber's line;

the central processor including means for polling the port processors successively in search of port processors whose condition indicates that they require call-setting service, means responsive to the polling and to port processors being found in said call-setting condition for allocating time slots in a TDM cycle at which the calls in respect of the subscriber lines connected to such ports are established, and means for signalling the identity of each said time slot allocated to a call to the port processors; the port processors including means for connecting the subscriber lines to the intelligence bus at an appropriate one of said time slots, whereby switching operations needed for call setting are decentralized, and whereby all signalling is effected via the signalling bus, the intelligence bus being used only to convey intelligence such as speech and tones.

8. An exchange as claimed in claim 7, wherein to set up a call between two of said lines, two time slots in the TDM cycle are allocated to the call by the central processor, one such time slot being used for each direction of transmission.

9. An exchange as claimed in claim 7, wherein each said system port which serves subscriber lines serves two such lines, the port processor for that port functioning in respect of both the lines which it serves.

10. An exchange as claimed in claim 7 further comprising a trunk line port, the trunk line port serving a trunk line from the exchange to another remote exchange, and the trunk line port being connected both to the signalling bus and to the intelligence bus.

11. An exchange as claimed in claim 7 further comprising a trunk line port serving a trunk line which extends to a remote exchange, a telephone associated with the said trunk line port, and a power failure responsive device which, in response to a power failure in the exchange, connects said telephone to the trunk line.

* * * * *